(12) United States Patent
Kim

(10) Patent No.: US 12,556,014 B2
(45) Date of Patent: Feb. 17, 2026

(54) BATTERY CONTROL DEVICE, BATTERY SYSTEM, POWER SUPPLY SYSTEM, AND BATTERY CONTROL METHOD

(71) Applicant: LG ENERGY SOLUTION, LTD., Seoul (KR)

(72) Inventor: Han-Sol Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 735 days.

(21) Appl. No.: 17/928,835

(22) PCT Filed: Jan. 11, 2022

(86) PCT No.: PCT/KR2022/000493
§ 371 (c)(1),
(2) Date: Nov. 30, 2022

(87) PCT Pub. No.: WO2022/149958
PCT Pub. Date: Jul. 14, 2022

(65) Prior Publication Data
US 2023/0208170 A1    Jun. 29, 2023

(30) Foreign Application Priority Data

Jan. 11, 2021 (KR) .................. 10-2021-0003201

(51) Int. Cl.
*H02J 7/00* (2006.01)
*H01M 10/42* (2006.01)
*H01M 10/48* (2006.01)

(52) U.S. Cl.
CPC .......... *H02J 7/005* (2020.01); *H01M 10/425* (2013.01); *H02J 7/0019* (2013.01); *H02J 7/0048* (2020.01); *H01M 2010/4271* (2013.01)

(58) Field of Classification Search
CPC ........ H02J 7/005; H02J 7/0019; H02J 7/0048; H01M 10/441; H01M 2010/4271; G01R 31/392; G01R 31/396
(Continued)

(56) References Cited

U.S. PATENT DOCUMENTS

| | | | |
|---|---|---|---|
| 2011/0127963 A1 | 6/2011 | Murao et al. |
| 2012/0013304 A1 | 1/2012 | Murase et al. |
| 2012/0268070 A1 | 10/2012 | Park et al. |
| 2013/0320772 A1 | 12/2013 | Qiao et al. |

(Continued)

FOREIGN PATENT DOCUMENTS

| | | | |
|---|---|---|---|
| EP | 2 738 908 A1 | 6/2014 |
| EP | 3 007 310 A2 | 4/2016 |

(Continued)

OTHER PUBLICATIONS

International Search Report (with partial translation) and Written Opinion dated Apr. 22, 2022, for corresponding International Patent Application No. PCT/KR2022/000493.

(Continued)

*Primary Examiner* — Julian D Huffman
*Assistant Examiner* — Ryu-Sung P. Weinmann
(74) *Attorney, Agent, or Firm* — Morgan, Lewis & Bockius LLP

(57) ABSTRACT

A battery control apparatus according to the present disclosure includes a plurality of switching circuits connected in series to a plurality of battery packs; a plurality of sensing circuits to generate a sensing signal indicating a voltage and a current of each battery pack; and a control circuit to determine the voltage, a state of health (SOH) and a state of charge (SOC) of each battery pack. According to an embodiment of the present disclosure, in the selective parallel connection control for at least one of the plurality of batteries, it is possible to reduce a difference in SOH between the plurality of batteries.

16 Claims, 5 Drawing Sheets

(58) Field of Classification Search
USPC .......................................... 320/107, 124–127
See application file for complete search history.

(56) References Cited

U.S. PATENT DOCUMENTS

| | | | | |
|---|---|---|---|---|
| 2014/0167657 | A1* | 6/2014 | Nishikawa | B60L 58/15 |
| | | | | 320/134 |
| 2015/0194707 | A1 | 7/2015 | Park | |
| 2016/0105044 | A1* | 4/2016 | Yamaguchi | H02J 7/0013 |
| | | | | 320/112 |
| 2018/0090948 | A1 | 3/2018 | Park | |
| 2019/0324090 | A1 | 10/2019 | Jung et al. | |
| 2020/0282861 | A1 | 9/2020 | Kim et al. | |

FOREIGN PATENT DOCUMENTS

| | | |
|---|---|---|
| JP | 2010-232104 A | 10/2010 |
| JP | 4929967 B2 | 5/2012 |
| JP | 2014-514692 A | 6/2014 |
| JP | 5562617 B2 | 7/2014 |
| JP | 2016-077139 A | 5/2016 |
| JP | 2019-009909 A | 1/2019 |
| KR | 10-2014-0051881 A | 5/2014 |
| KR | 10-2015-0081731 A | 7/2015 |
| KR | 10-2018-0032907 A | 4/2018 |
| KR | 10-2019-0122996 A | 10/2019 |

OTHER PUBLICATIONS

The extended European Search Report (EESR) dated Apr. 25, 2024, issued in corresponding EP Patent Application No. 22736935.2.
Office Action dated Nov. 6, 2023, issued in corresponding Japanese Patent Application No. 2022-570391.
Office Action dated Nov. 19, 2025, issued in corresponding Chinese Patent Application No. 202280004155.5.

* cited by examiner

BATTERY CONTROL DEVICE, BATTERY SYSTEM, POWER SUPPLY SYSTEM, AND BATTERY CONTROL METHOD

TECHNICAL FIELD

The present application claims the benefit of Korean Patent Application No. 10-2021-0003201 filed on Jan. 11, 2021 with the Korean Intellectual Property Office, the disclosure of which is incorporated herein by reference in its entirety.

The present disclosure relates to technology to reduce a difference in State Of Health (SOH) between a plurality of battery packs.

BACKGROUND ART

Recently, there has been a rapid increase in the demand for portable electronic products such as laptop computers, video cameras and mobile phones, and with the extensive development of electric vehicles, accumulators for energy storage, robots and satellites, many studies are being made on high performance batteries that can be recharged repeatedly.

Currently, commercially available batteries include nickel-cadmium batteries, nickel-hydrogen batteries, nickel-zinc batteries, lithium batteries and the like, and among them, lithium batteries have little or no memory effect, and thus they are gaining more attention than nickel-based batteries for their advantages that recharging can be done whenever it is convenient, the self-discharge rate is very low and the energy density is high.

Recently, not only energy storage systems but also electric vehicles require high capacity for stable power management. Accordingly, it is common to carry out control to selectively connect at least one of a plurality of batteries in parallel according to the power required from an external device, using a battery bank installed to connect the plurality of batteries in parallel.

In executing a discharge event of the battery bank, the conventional technology controls all or some of the plurality of batteries to participate in the discharge event in a descending order of State Of Charge (SOC) for the continuous and stable discharge.

This method is efficient to some extent when the discharge event is executed a small number of times. However, when only the SOC is used as the most important parameter of discharge control without considering the State Of Health (SOH) of each battery, eventually, it causes non-uniform degradation of the plurality of batteries, and in particular, from the long-term perspective, the overall operational efficiency of the system decreases due to some batteries with a large reduction in SOH, and it takes high costs and long time to repair, replace and recover the corresponding batteries.

DISCLOSURE

Technical Problem

The present disclosure is designed to solve the above-described problem, and therefore the present disclosure is directed to providing a battery control apparatus, a battery system, a power supply system and a battery control method for reducing a difference in state of health (SOH) between a plurality of batteries in the selective parallel connection control of at least one of the plurality of batteries.

These and other objects and advantages of the present disclosure may be understood by the following description and will be apparent from the embodiments of the present disclosure. In addition, it will be readily understood that the objects and advantages of the present disclosure may be realized by the means set forth in the appended claims and a combination thereof.

Technical Solution

A battery control apparatus according to an aspect of the present disclosure includes a plurality of switching circuits connected in series to a plurality of battery packs in a one-to-one relationship; a plurality of sensing circuits connected to the plurality of battery packs in a one-to-one relationship, and configured to generate a sensing signal indicating a voltage and a current of each battery pack; and a control circuit configured to determine the voltage, a state of health (SOH) and a state of charge (SOC) of each of the plurality of battery packs based on the sensing signal. When there is no battery pack having the SOH with a difference between the SOH and a maximum SOH of the plurality of battery packs being larger than a reference SOH, the control circuit is configured to set all the plurality of battery packs as a discharge candidate. The control circuit is configured to set at least one first pack group, each including at least one battery pack by applying a grouping rule to all the discharge candidates. In case of a single first pack group, the control circuit is configured to set the first pack group as a discharge group. The control circuit is configured to turn on each switching circuit corresponding to each battery pack of the discharge group and turn off the switching circuit corresponding to each remaining battery pack except the discharge group.

When there is a battery pack having the SOH with the difference between the SOH and the maximum SOH being larger than the reference SOH, the control circuit is configured to set the remaining battery pack except the battery pack having the SOH that is lower than the maximum SOH by the reference SOH or more among the plurality of battery packs as the discharge candidate.

The grouping rule states that each first pack group includes a maximum number of battery packs in which a voltage difference between a maximum voltage and a minimum voltage is equal to or less than a reference voltage.

In case of a plurality of first pack groups, the control circuit may be configured to determine a sum of SOCs of each of the plurality of first pack groups. The sum of SOCs is a sum of SOCs of all the battery packs of each first pack group. The control circuit may be configured to set each first pack group having a maximum sum of SOCs among the plurality of first pack groups as a second pack group. In case of a single second pack group, the control circuit may be configured to set the second pack group as the discharge group.

In case of a plurality of second pack groups, the control circuit may be configured to set each second pack group having a maximum number of members among the plurality of second pack groups as a third pack group. In case of a single third pack group, the control circuit may be configured to set the third pack group as the discharge group.

In case of a plurality of third pack groups, the control circuit may be configured to determine a discharge risk factor of each of the plurality of third pack groups. The control circuit may be configured to set the third pack group having a lowest discharge risk factor among the plurality of third pack groups as the discharge group.

In case of a plurality of third pack groups, the control circuit may be configured to determine a discharge priority factor of each of the plurality of third pack groups. The control circuit may be configured to set the third pack group having a highest discharge priority factor among the plurality of third pack groups as the discharge group.

A battery system according to another aspect of the present disclosure includes the battery control apparatus.

A power supply system according to still another aspect of the present disclosure includes the battery system.

A battery control method according to yet another aspect of the present disclosure may be performed by the battery control apparatus. The battery control method includes determining the voltage, SOH and SOC of each of the plurality of battery packs based on the sensing signal indicating the voltage and current of each of the plurality of battery packs; when there is no battery pack having the SOH with a difference between the SOH and the maximum SOH of the plurality of battery packs being less than the reference SOH, setting all the plurality of battery packs as the discharge candidate; setting at least one first pack group, each including at least one battery pack by applying the grouping rule to all the discharge candidates; in case of a single first pack group, setting the first pack group as the discharge group; and turning on each switching circuit corresponding to each battery pack of the discharge group, and turning off each switching circuit corresponding to the remaining battery pack except the first pack group.

When there is any battery pack having the SOH with a difference between the SOH and the maximum SOH being larger than the reference SOH, the battery control method may further include setting the remaining battery pack except the battery pack having the SOH that is lower than the maximum SOH by the reference SOH or more among the plurality of battery packs as the discharge candidate.

Advantageous Effects

According to at least one of the embodiments of the present disclosure, it is possible to reduce a difference in state of health (SOH) between a plurality of batteries in the selective parallel connection control of at least one of the plurality of batteries.

The effects of the present disclosure are not limited to the above-mentioned effects, and these and other effects will be clearly understood by those skilled in the art from the appended claims.

BRIEF DESCRIPTION OF DRAWINGS

The accompanying drawings illustrate preferred embodiments of the present disclosure, and together with the detailed description of the present disclosure as described below, serve to provide a further understanding of the technical aspects of the present disclosure, and thus the present disclosure should not be construed as being limited to the drawings.

MODES OF PRACTICING THE DISCLOSURE

Figure 1:
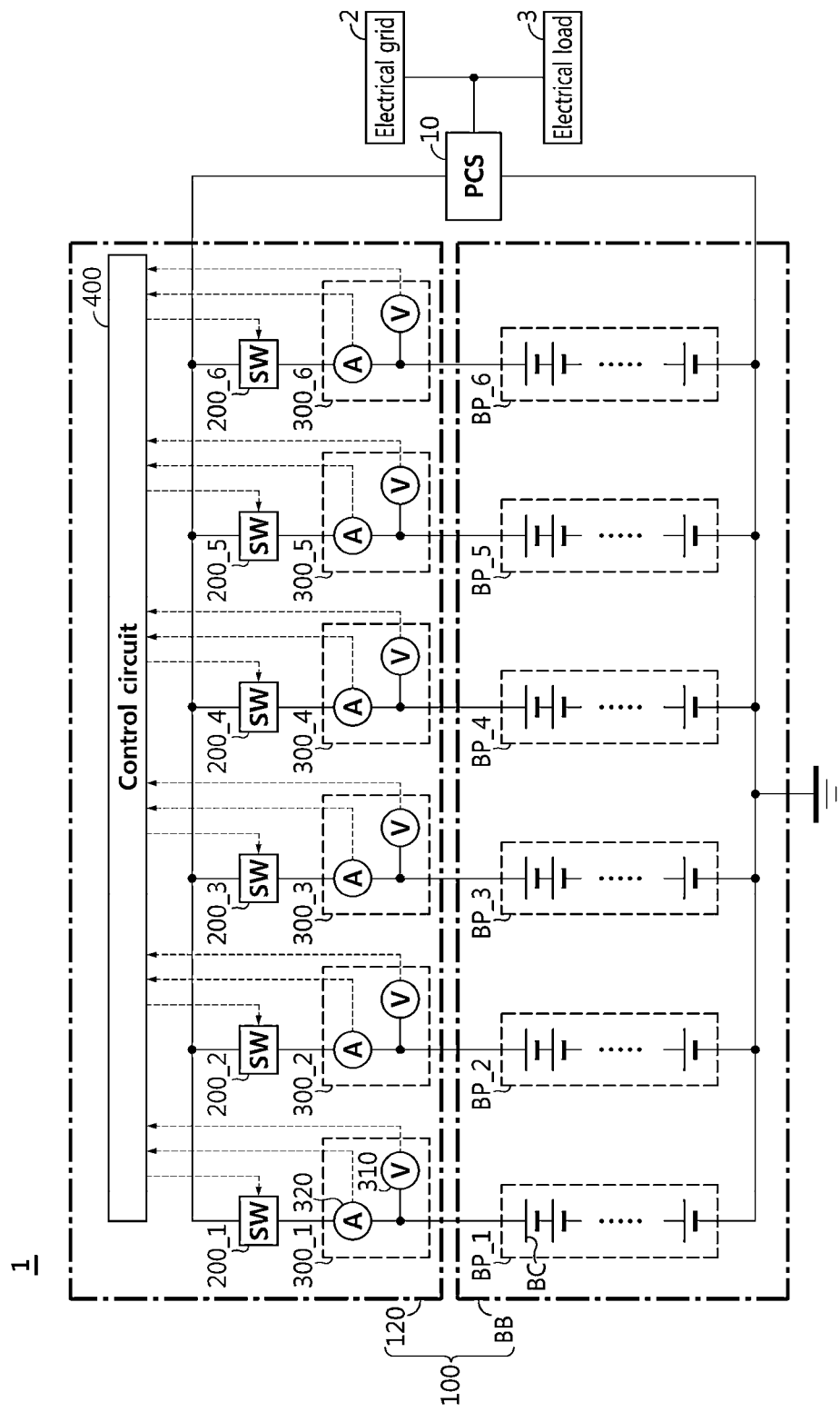
FIG. 1 is an example diagram of a power supply system according to the present disclosure.

Hereinafter, preferred embodiments of the present disclosure will be described in detail with reference to the accompanying drawings. Prior to the description, it should be understood that the terms or words used in the specification and the appended claims should not be construed as being limited to general and dictionary meanings, but rather should be interpreted based on the meanings and concepts corresponding to the technical aspects of the present disclosure on the basis of the principle that the inventor is allowed to define the terms appropriately for the best explanation.

Therefore, the embodiments described herein and the illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

The terms including the ordinal number such as "first", "second" and the like, are used to distinguish one element from another among various elements, but not intended to limit the elements.

Unless the context clearly indicates otherwise, it will be understood that the term "comprises" when used in this specification, specifies the presence of stated elements, but does not preclude the presence or addition of one or more other elements. Additionally, the term "control unit" as used herein refers to a processing unit of at least one function or operation, and may be implemented by hardware and software either alone or in combination.

In addition, throughout the specification, it will be further understood that when an element is referred to as being "connected to" another element, it can be directly connected to the other element or intervening elements may be present.

FIG. 1 is an exemplary diagram of a power supply system 1 according to the present disclosure.

Referring to FIG. 1, the power supply system 1 includes a power conversion system 10 and a battery system 100.

The power conversion system 10 is electrically connected between the battery system 100 and an electrical grid 2 and/or an electrical load 3. The power conversion system 10 is responsible for bi-directional power transfer between the battery system 100 and the electrical grid 2 and/or the electrical load 3 using a direct current (DC)-alternating current (AC) inverter and/or a DC-DC converter provided therein. That is, while in a charge mode, the power conversion system 10 may convert AC power supplied from the electrical grid 2 to DC power and supply it to the battery system 100. Additionally, while in a discharge mode, the power conversion system 10 may convert the input DC power by the discharge of the battery system 100 to AC power and supply it to the electrical grid 2 and/or the electrical load 3.

The power conversion system 10 may acquire state information of each of the battery system 100 and the electrical grid, and transmit a charge command, a discharge command and/or a rest command to the battery system 100 based on the acquired state information. The power conversion system 10 controls the DC-AC inverter into the charge mode while transmitting the charge command. The power conversion system 10 controls the DC-AC inverter into the discharge mode while transmitting the discharge command.

The charge command is a signal that commands the battery system 100 to store the DC power supplied from the power conversion system 10. The discharge command is a signal that commands the battery system 100 to supply the stored DC power to the power conversion system 10. The rest command is a signal that commands the battery system 100 to stop charging and discharging.

The battery system 100 includes a battery bank BB and a battery control apparatus 120.

The battery bank BB includes a plurality of battery packs BP_1~BP_6. In the specification, in the description that is common to the plurality of battery packs BP_1~BP_6, the symbol 'BP' is affixed to the battery pack. Although FIG. 1 shows the battery bank BB including a total of six battery packs BP_1~BP_6 for convenience of description, where the battery bank BB includes at least two battery packs BP, there is no particular limitation on the number of battery packs BP.

The battery pack BP includes at least one battery cell BC connected in series. In the specification, the battery cell BC refers to a basic unit of a battery that can be recharged singly, and the battery cell BC is not limited to a particular type and may include, for example, any type of rechargeable battery, such as a lithium-ion cell BC.

The battery control apparatus 120 is configured to control a discharge event and/or a charge event of the plurality of battery packs BP_1~BP_6 to reduce a difference in degradation level between the plurality of battery packs BP_1~BP_6.

The battery control apparatus 120 includes a plurality of switching circuits 200_1~200_6, a plurality of sensing circuits 300_1~300_6 and a control circuit 400.

The plurality of switching circuits 200_1~200_6 is connected in series to the plurality of battery packs BP_1~BP_6 in a one-to-one relationship. That is, the plurality of battery packs BP_1~BP_6 is connected in parallel through the plurality of switching circuits 200_1~200_6. In the specification, in the description that is common to the plurality of switching circuits 200_1~200_6, the reference numeral '200' is affixed to the switching circuit. The switching circuit 200 is not limited to a particular type and may include any type of switching circuit capable of switching on/off a current path between the battery pack BP and the power conversion system 10. For example, the switching circuit 200 may include a semiconductor switch such as a metal oxide semiconductor field effect transistor (MOSFET) and a mechanical switch such as a relay. In another example, the switching circuit 200 may include a bidirectional DC-DC converter. When i is a natural number, while the switching circuit 200_i is turned on, the battery pack BP_i can be charged/discharged. While the switching circuit 200_i is turned off, the battery pack BP_i is electrically separated from the power conversion system 10.

The plurality of sensing circuits 300_1~300_6 is connected to the plurality of battery packs BP_1~BP_6 in a one-to-one relationship. The sensing circuit 300 includes a voltage sensor 310 and a current sensor 320. In the specification, in the description that is common to the plurality of sensing circuits 300_1~300_6, the reference numeral '300' is affixed to the sensing circuit. The sensing circuit 300 measures the voltage and the current of the connected battery pack BP using the voltage sensor 310 and the current sensor 320. The voltage sensor 310 is connected in parallel to the battery pack BP, and measures the voltage across the battery pack BP. The current sensor 320 is connected to a power line connecting the battery pack BP to the switching circuit 200, and measures the current flowing through the battery pack BP. The sensing circuit 300 generates a sensing signal indicating the measured voltage and the measured current. The sensing signal indicates a pair of synchronization-detected voltage and current values.

The control circuit 400 may be implemented in hardware using at least one of application specific integrated circuits (ASICs), digital signal processors (DSPs), digital signal processing devices (DSPDs), programmable logic devices (PLDs), field programmable gate arrays (FPGAs), microprocessors or electrical units for performing the other functions.

The control circuit 400 may have a memory device. The memory device may include at least one type of storage medium of flash memory type, hard disk type, Solid State Disk (SSD) type, Silicon Disk Drive (SDD) type, multimedia card micro type, random access memory (RAM), static random access memory (SRAM), read-only memory (ROM), electrically erasable programmable read-only memory (EEPROM) or programmable read-only memory (PROM). The memory device may store data and programs required for computation by the control circuit 400. The memory device may store data indicating the result of computation by the control circuit 400.

The control circuit 400 is operably coupled to the plurality of switching circuits 200_1~200_6, the plurality of sensing circuits 300_1~300_6 and the power conversion system 10. The operably coupled refers to connected to transmit and receive a signal in one or two ways.

The control circuit 400 periodically or aperiodically collects the sensing signal from each of the plurality of sensing circuits 300_1~300_6. The control circuit 400 determines the voltage, a state of health (SOH) and a state of charge (SOC) of each of the plurality of battery packs BP_1~BP_6 based on the sensing signal.

The SOH is a ratio of the maximum capacity to the design capacity, and in general, the SOC is represented in the range between 0 and 100%. The design capacity indicates a maximum amount of electric charge that can be stored in the battery pack BP when the battery pack BP_ is in fresh condition. The maximum capacity indicates a maximum amount of electric charge that can be stored in the battery pack BP when the battery pack BP is degraded from the fresh condition. As the battery pack BP degrades, the maximum capacity gradually reduces from the design capacity.

The SOC is a ratio of the residual capacity to the maximum capacity, and in general, the SOC is represented in the range between 0 and 100%. The residual capacity indicates an amount of electric charge that is currently stored in the battery pack BP.

Each of the SOH and SOC can be estimated from at least one of various known schemes, and its detailed description is omitted.

When the control circuit 400 receives the discharge command from the power conversion system 10, the control circuit 400 executes the discharge event in response to the discharge command. The discharge event is a procedure of selecting at least one of the plurality of battery packs BP_1~BP_6, and turning on the switching circuit 200 corresponding to each selected battery pack BP to supply the DC power from each selected battery pack BP to the power conversion system 10.

The discharge event starts when at least one of the plurality of battery packs BP_1~BP_6 is set as a discharge candidate by the control circuit 400. Hereinafter, the setting of the discharge candidate will be described in detail.

First, the control circuit 400 determines the maximum SOH by comparing the SOH of each of the plurality of battery packs BP_1~BP_6. Subsequently, the control circuit 400 determines if there is any SOH with a difference between the SOH and the maximum SOH being larger than a reference SOH. For example, the control circuit 400 determines whether a difference between the maximum SOH and the minimum SOH is equal to or larger than the reference SOH. The reference SOH is a preset value (for example, 3%) that reduces the usage frequency in the charge and/or discharge event of any of the plurality of battery packs BP_1~BP_6 having a smaller SOH, to reduce a difference in SOH between the plurality of battery packs BP_1~BP_6.

When there is no SOH that is smaller than the maximum SOH by the reference SOH or more, the control circuit 400 sets all the plurality of battery packs BP_1~BP_6 as the discharge candidate. In contrast, when there is a SOH that is smaller than the maximum SOH by the reference SOH or more, the control circuit 400 sets, as the discharge candidate, the remaining battery pack BP except the battery pack BP having the SOH that is smaller than the maximum SOH by the reference SOH or more. When only one battery pack BP is set as the discharge candidate, the discharge event of the corresponding battery pack BP may be immediately executed.

The control circuit 400 uses a preset grouping rule to select at least one battery pack BP of which the discharge event will actually be executed among the discharge candidates. The grouping rule is to prevent an inrush current that may occur when simultaneously connecting in parallel at least two battery packs BP having a voltage difference that is equal to or more than a reference voltage.

The grouping rule is used to set at least one first pack group from the discharge candidates, and sets, as the same group, the maximum number of battery packs BP_ in which a voltage difference between the maximum voltage and the minimum voltage is equal to or less than the reference voltage (for example, 10 V). In the specification, each group set according to the grouping rule is referred to as the first pack group. The control circuit 400 extracts all the first pack groups satisfying the grouping rule from the discharge candidates. When at least two first pack groups are set according to the grouping rule, the particular battery pack (for example, BP_3) may be a common member of at least two different first pack groups.

Hereinafter, the operation of determining the discharge group including at least one of the plurality of battery packs BP_1~BP_6 as its member will be described with reference to FIGS. 2 and 3.

Figure 2:
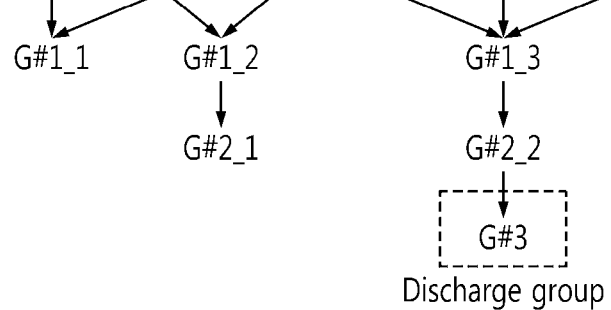
FIG. 2 shows an example of a data table for reference in describing a procedure of determining a discharge group from a plurality of battery packs shown in FIG. 1.

FIG. 2 shows a table TABLE_A displaying the voltage, the SOC and the SOH of each of the plurality of battery packs BP_1~BP_6. For convenience of description, the table TABLE_A of FIG. 2 shows the voltages of the first to sixth battery packs BP_1~BP_6 arranged in a descending order. In FIG. 2, when the reference SOH is 3%, all the battery packs BP_1~BP_6 are set as the discharge candidate since a difference of 2% between the maximum SOH of 90% and the minimum SOH of 88% is less than the reference SOH.

The control circuit 400 determines at least one first pack group from the discharge candidates BP_1~BP_6 by applying the grouping rule to the discharge candidates BP_1~BP_6. When only one first pack group is determined, the control circuit 400 turns on each switching circuit 200 corresponding to each battery pack BP of the corresponding first pack group and turns off each switching circuit 200 corresponding to the remaining battery pack BP except the first pack group.

According to the table TABLE_A of FIG. 2, a total of three first pack groups is determined according to the grouping rule using 10V as the reference voltage. That is, the first battery pack BP_1 and the second battery pack BP_2 are determined as the first pack group G #1_1, the second battery pack BP_2 and the third battery pack BP_3 are determined as other first pack group G #1_2, and the fourth battery pack BP_4, the fifth battery pack BP_5 and the sixth battery pack BP_6 are determined as another first pack group G #1_3.

For reference, by the grouping rule, when there is any other discharge candidate having a voltage difference of less than the reference voltage between each discharge candidate and the other discharge candidate, it cannot be set solely as the first pack group. For example, since a voltage difference of 3V between the third battery pack BP_3 and the second battery pack BP_2 is less than the reference voltage of 10V, the third battery pack BP_3 and the second battery pack BP_2 cannot be a single member of a first pack group.

In the case of a plurality of first pack groups G #1_1~G #1_3 as shown in FIG. 2, the control circuit 400 sets the first pack group having the maximum sum of SOCs as a second pack group. The sum of SOCs is the sum of SOCs of each battery pack BP_ of each first pack group. According to the table TABLE_A of FIG. 2, the sum of SOCs of the first pack group G #1_1 is 61%, the sum of SOCs of other first pack group G #1_2 is 64%, and the sum of SOCs of another first pack group G #1_3 is 64%. Since the two first pack groups G #1_2, G #1_3 have the maximum sum of SOCs, two first pack groups G #1_2, G #1_3 out of the three first pack groups G #1_1~G #1_3 are set as the second pack group G #2_1, G #2_2, respectively.

When only one second pack group is determined, the control circuit 400 turns on the switching circuit 200 corresponding to each battery pack BP of the corresponding second pack group and turns off the switching circuit 200 corresponding to the remaining battery pack BP except the second pack group.

In contrast, when at least two second pack groups G #2_1, G #2_2 are set as shown in FIG. 2, the control circuit 400 sets any of the at least two second pack groups G #2_1, G #2_2 having the maximum number of members as a third pack group. Since the number of members of the second pack group G #2_1 is 2 and the number of members of the other second pack group G #2_2 is 3, the other second pack group G #2_2 is set as the third pack group G #3.

When only one third pack group G #3 is determined as shown in FIG. 2, the control circuit 400 sets the third pack group G #3 as the discharge group. The control circuit 400 turns on the switching circuits 200_4~200_6 corresponding respectively to the battery packs BP_4~BP_6 that are the members of the discharge group G #3, and turns off the switching circuits 200_1~200_3 corresponding to the remaining battery packs BP_1~BP_3 except the discharge group G #3.

As opposed to FIG. 2, when at least two third pack groups are determined, the control circuit 400 may determine a discharge risk factor of each third pack group and set any of the at least two third pack groups having the minimum discharge risk factor as a fourth pack group.

The discharge risk factor of the particular group corresponds to the amount of damage applied to the battery pack belonging to the corresponding particular group by additional discharge from the present time. In relation to the discharge risk factor, the battery pack BP has a characteristic that as the SOC is closer to the fully discharged state (i.e., SOC 0%) below the reference SOC, degradation is faster.

The reference SOC is preset through testing of test battery packs having the same electrochemical specification as the battery pack BP. That is, even though the discharge power is equal, the degradation rate of the battery pack BP varies depending on the SOC of the battery pack BP. In view of this fact, the control circuit 400 may determine the discharge risk factor of each third pack group using the following Equation 1.

$$P_A = \sum_{x=1}^{y}(\Delta SOC_1[x]^m - \Delta SOC_2[x]^n) \qquad \langle \text{Equation 1} \rangle$$

In Equation 1, $P_A$ is the discharge risk factor of the particular group, and y is the number of members of the particular group. m is a predetermined exponent (for example, 2) that is larger than 1, and n is a predetermined exponent (for example, 1.3) that is larger than 1. In the same way as the reference SOC, the first and second exponents are preset through testing of the test battery packs. When $SOC_r$ is the reference SOC and $SOC_x$ is the SOC of the $x^{th}$ member of the particular group, in case that $SOC_x$ is equal to or larger than $SOC_r$, $\Delta SOC_1[x]$ is set to 0, and when $SOC_x$ is less than $SOC_r$, $\Delta SOC_1[x]$ is set to be equal to ($SOC_x$-$SOC_r$). When $SOC_x$ is equal to or larger than $SOC_r$, $\Delta SOC_2[x]$ is set to be equal to ($SOC_x$-$SOC_r$), and when $SOC_x$ is less than $SOC_r$, $\Delta SOC_2[x]$ is set to 0.

Alternatively, when at least two third pack groups are determined, the control circuit 400 may determine a discharge priority factor of each third pack group and may set any of the at least two third pack groups having the maximum discharge priority factor as the fourth pack group.

The discharge priority factor of the particular group corresponds to the current discharging capability of the corresponding particular group. That is, the discharge priority factor of the particular group may be determined from the following Equation 2.

$$P_B = \sum_{x=1}^{y}(V_x^j \times SOC_x^k \times SOH_x^l) \qquad \langle \text{Equation 2} \rangle$$

In Equation 2, $P_B$ is the discharge priority factor of the particular group, y is the number of members of the particular group, and $V_x$, $SOC_x$ and SOH are the voltage, SOC and SOH of the $x^{th}$ member of the particular group, respectively. j is a predetermined exponent (for example, 1.2) that is larger than 0, k is a predetermined exponent (for example, 0.8) that is larger than 0, and l is a predetermined exponent (for example, 1.5) that is larger than 0. Each of j, k and l is preset through testing of the test battery packs.

Alternatively, when at least two third pack groups are determined, the control circuit 400 may set only one of the at least two third pack groups as the fourth pack group using both the discharge risk factor and the discharge priority factor. For example, any of the at least two third pack groups in which (i) a value obtained by dividing the discharge risk factor by the discharge priority factor is minimum, (ii) a value obtained by dividing the discharge priority factor by the discharge risk factor is maximum, (iii) a value obtained by subtracting the discharge priority factor from the discharge risk factor is minimum or (iv) a value obtained by subtracting the discharge risk factor from the discharge priority factor is maximum may be set as the fourth pack group.

Figure 3:
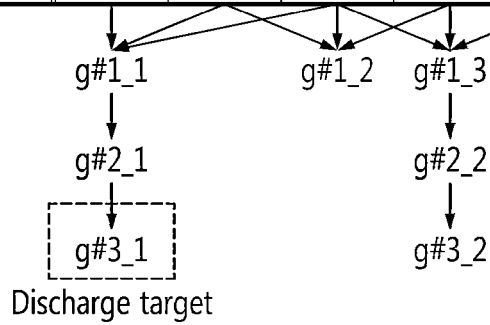
FIG. 3 shows another example of a data table for reference in describing a procedure of determining a discharge group from a plurality of battery packs shown in FIG. 1.

FIG. 3 shows another table TABLE_B displaying the voltage, SOC and SOH of each of the plurality of battery packs BP_1~BP_6. For convenience of description, FIG. 3 shows the voltages of the first to sixth battery packs BP_1~BP_6 arranged in a descending order. In FIG. 3, when the reference SOH is 3%, the sixth battery pack BP_6 has the SOH of 85% that is smaller than the maximum SOH of 90% by the reference SOH or more. Accordingly, the control circuit 400 sets only the remaining battery packs BP_1~BP_5 except the sixth battery pack BP_6 as the discharge candidate. In describing the present disclosure with reference to FIG. 3, it is noted that an overlapping description with the foregoing description made with reference to FIG. 2 may be omitted.

The control circuit 400 sets at least one first pack group from the discharge candidates BP_1~BP_5 by applying the grouping rule to the discharge candidates BP_1~BP_5.

According to the table TABLE_B of FIG. 3, a total of three first pack groups is determined according to the grouping rule using 10V as the reference voltage. That is, the first battery pack BP_1, the second battery pack BP_2 and the third battery pack BP_3 are determined as a first pack group g #1_1, the second battery pack BP_2, the third battery pack BP_3 and the fourth battery pack BP_4 are determined as other first pack group g #1_2, and the third battery pack BP_3, the fourth battery pack BP_4 and the fifth battery pack BP_5 are determined as another first pack group g #1_3.

The control circuit 400 sets the first pack group having the maximum sum of SOCs among the three first pack groups g #1_1~g #1_3 as the second pack group. According to the table TABLE_B of FIG. 3, the sum of SOCs of the first pack group g #1_1 is 96%, the sum of SOCs of other first pack group g #1_2 is 95%, and the sum of SOCs of another first pack group g #1_3 is 96%. Since the two first pack groups g #1_1, g #1_3 have the maximum sum of SOCs, the two first pack groups g #1_1, g #1_3 out of the three first pack groups g #1_1~g #1_3 are set as the second pack group g #2_1, g #2_2, respectively.

When the at least two second pack groups g #2_1, g #2_2 are set as shown in FIG. 3, the control circuit 400 sets any of the at least two second pack groups g #2_1, g #2_2 having the maximum number of members as the third pack group. Since the number of members of the second pack group g #2_1 and the second pack group g #2_2 is equally 3, both the two second pack groups g #2_1, g #2_2 are set as the third pack group g #3_1, g #3_2.

The control circuit 400 may set any of the at least two third pack groups g #3_1, g #3_2 having the minimum discharge risk factor (for example, g #3_1) as a discharge target (see Equation 1).

Alternatively, the control circuit 400 may set any of the at least two third pack groups g #3_1, g #3_2 having the maximum discharge priority factor (for example, g #3_1) as the discharge target (see Equation 2).

Alternatively, the control circuit 400 may set one of the at least two third pack groups g #3_1, g #3_2 (for example, g #3_1) as the discharge target using both the discharge risk factor and the discharge priority factor.

When the third pack group g #3_1 is the discharge target, the control circuit 400 may turn on the switching circuits 200_1~200_3 corresponding respectively to the battery pack BP_1~BP_3 of the discharge target g #3_1, and turn off the switching circuits 200_4~200_6 corresponding to the remaining battery packs BP_4~BP_6 except the discharge target g #3_1.

Figure 4:
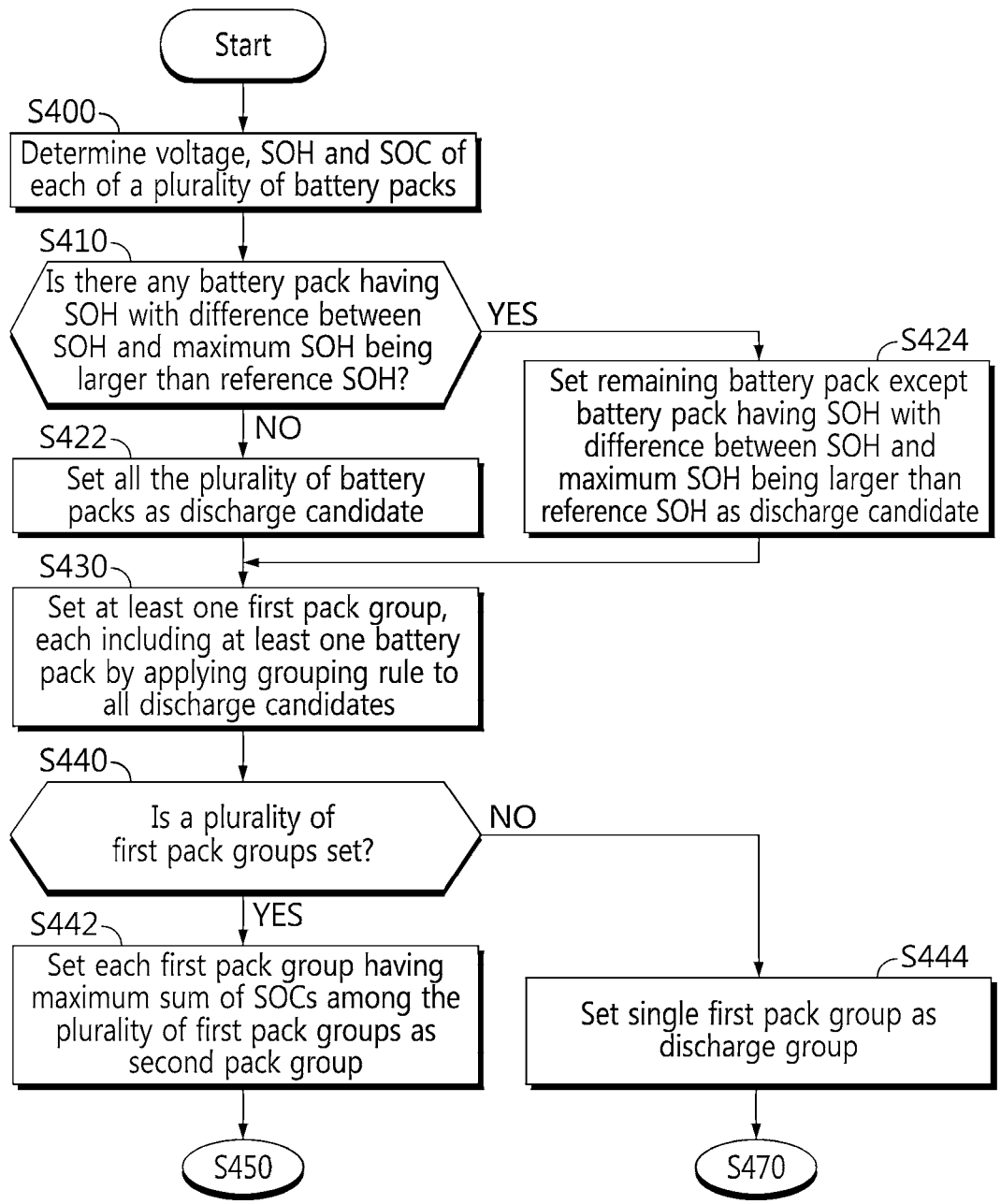
FIGS. 4 and 5 are example flowcharts of a battery control method according to an embodiment of the present disclosure.
Figure 5:
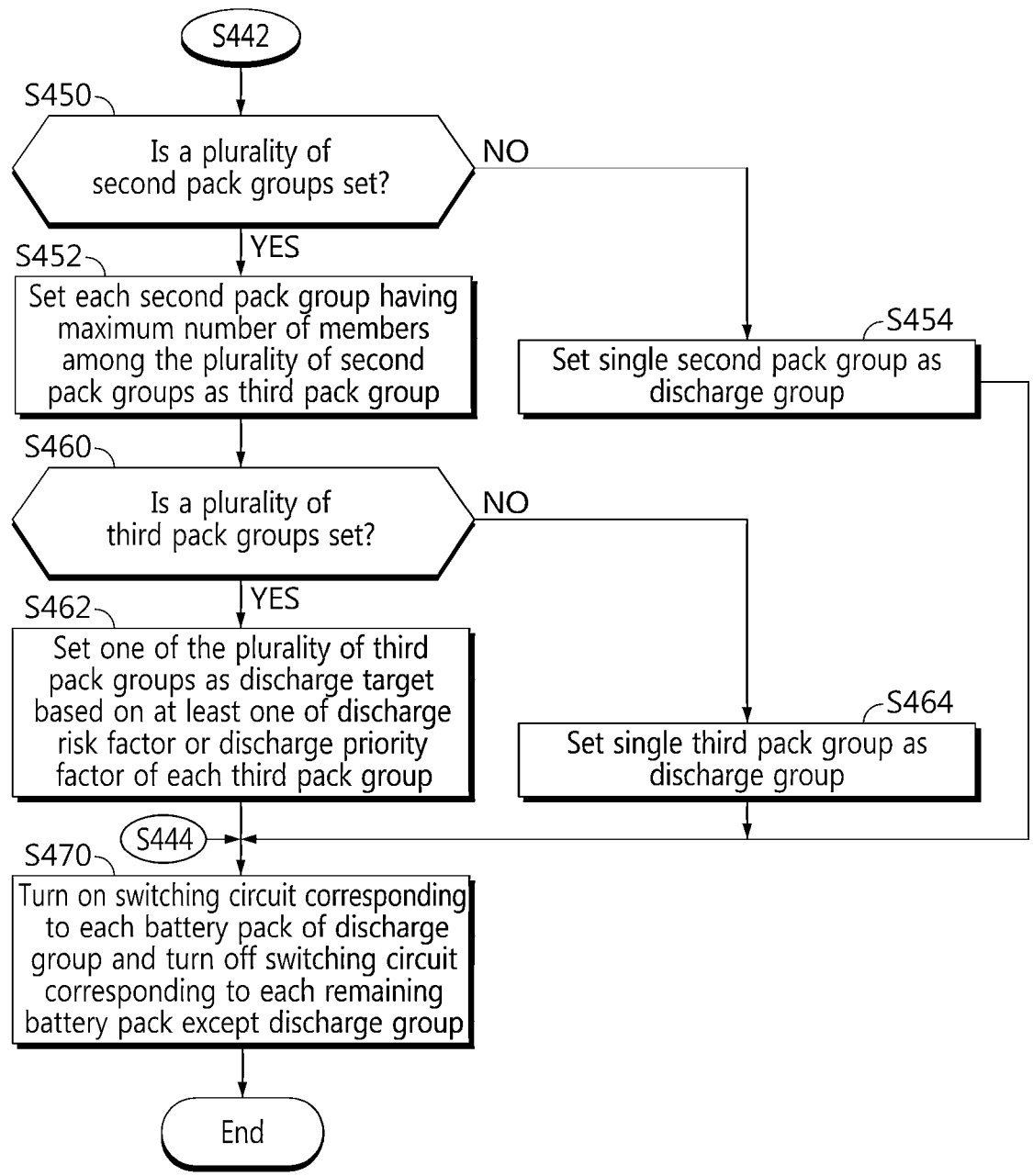

FIGS. 4 and 5 are exemplary flowcharts of a battery control method according to an embodiment of the present disclosure. The method of FIGS. 4 and 5 may be performed by the battery control apparatus.

Referring to FIGS. 1 to 5, in step S400, the control circuit 400 determines the voltage, SOH and SOC of each of the plurality of battery packs BP_1~BP_6 based on the sensing signal indicating the voltage and current of each of the plurality of battery packs BP_1~BP_6.

In step S410, the control circuit 400 determines if there is any battery pack having SOH with a difference between the SOH and the maximum SOH of the plurality of battery packs BP_1~BP_6 being larger than the reference SOH. When a value of the step S410 is "NO", step S422 is performed (see FIG. 2). When the value of the step S410 is "YES", step S424 is performed (see FIG. 3).

In the step S422, the control circuit 400 sets all the plurality of battery packs BP_1~BP_6 as the discharge candidate (see FIG. 2).

In the step S424, the control circuit 400 sets, as the discharge candidate, the remaining battery pack (for example, BP_1~BP_5) except the battery pack (for example, BP_6) having SOH with a difference between the SOH and the maximum SOH being larger than the reference SOH (see FIG. 3).

In step S430, the control circuit 400 sets at least one first pack group, each including at least one battery pack, by applying the grouping rule to all the discharge candidates. In the situation of FIG. 2, three first pack groups G #1_1~G #1_3 are set, and in the situation of FIG. 3, three first pack groups g #1_1~g #1_3 are set.

In step S440, the control circuit 400 determines if a plurality of first pack groups is set. In the situations of FIGS. 2 and 3, a value of the step S440 is "YES". When the value of the step S440 is "YES", step S442 is performed. When the value of the step S440 is "NO", step S444 is performed.

In the step S442, the control circuit 400 sets each first pack group having the maximum sum of SOCs among the plurality of first pack groups as the second pack group. In the situation of FIG. 2, the two second pack groups G #2_1, G #2_2 are set, and in the situation of FIG. 3, the two second pack groups g #2_1, g #2_2 are set.

In the step S444, the control circuit 400 sets a single first pack group as the discharge group.

In step S450, the control circuit 400 determines if a plurality of second pack groups is set. In the situations of FIGS. 2 and 3, a value of the step S450 is "YES". When the value of the step S450 is "YES", step S452 is performed. When the value of the step S450 is "NO", step S454 is performed.

In the step S452, the control circuit 400 sets each second pack group having the maximum number of members among the plurality of second pack groups as the third pack group. In the situation of FIG. 2, the single third pack group G #3 is set, and in the situation of FIG. 3, the two third pack groups g #3_1, g #3_2 are set.

In the step S454, the control circuit 400 sets a single second pack group as the discharge group.

In step S460, the control circuit 400 determines if a plurality of third pack groups is set. In the situation of FIG. 3, a value of the step S460 is "YES". When the value of the step S460 is "YES", step S462 is performed. In the situation of FIG. 2, the value of the step S460 is "NO". When the value of the step S460 is "NO", step S464 is performed.

In the step S462, the control circuit 400 sets one of the plurality of third pack groups as the discharge target based on the discharge risk factor (see Equation 1) and the discharge priority factor (see Equation 2) of each of the plurality of third pack groups.

In the step S464, the control circuit 400 sets a single third pack group as the discharge group.

In step S470, the control circuit 400 turns on the switching circuit (for example, 200_1~200_3) corresponding to each battery pack of the discharge group (for example, g #3_1), and turns off the switching circuits (for example, 200_4~200_6) corresponding respectively to the remaining battery packs BP_4~BP_6 except the discharge group (for example, g #3_1).

The embodiments of the present disclosure described hereinabove are not implemented only through the apparatus and method, and may be implemented through programs that perform the functions corresponding to the configurations of the embodiments of the present disclosure or recording media having the programs recorded thereon, and such implementation may be easily achieved by those skilled in the art from the disclosure of the embodiments described above.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, as many substitutions, modifications and changes may be made to the present disclosure described hereinabove by those skilled in the art without departing from the technical aspects of the present disclosure, the present disclosure is not limited by the above-described embodiments and the accompanying drawings, and all or some of the embodiments may be selectively combined to allow various modifications.

DESCRIPTION OF REFERENCE NUMERALS

1: Power supply system
10: Power conversion system
100: Battery system
BB: Battery bank
BP: Battery pack
BC: Battery cell
120: Battery control apparatus
200: Switching circuit
300: Sensing circuit
310: Voltage sensor
320: Current sensor
400: Control circuit

What is claimed is:
1. A battery control apparatus, comprising:
a plurality of switching circuits, each connected in series to a corresponding one of a plurality of battery packs in a one-to-one relationship;
a plurality of sensing circuits connected respectively to the plurality of battery packs in a one-to-one relationship, and configured to generate a sensing signal indicating a voltage and a current of each of the plurality of battery packs; and
a control circuit configured to determine the voltage, a state of health (SOH), and a state of charge (SOC) of each of the plurality of battery packs based on the sensing signal generated by a corresponding one of the sensing circuits,
wherein the control circuit is configured to:

if there is no battery pack among the plurality of battery packs having the SOH differing from a maximum SOH of the plurality of battery packs by more than a reference SOH, set each of the plurality of battery packs as a discharge candidate, set at least one first pack group, including at least one battery pack among the plurality of battery packs, by applying a grouping rule to each of the discharge candidates, if only a single first pack group is set, set the single first pack group as a discharge group, and turn on each switching circuit among the switching circuits corresponding to at least one battery pack included in the discharge group among the plurality of battery packs, and turn off one or more other switching circuits among the switching circuits corresponding to any remaining battery pack not in the discharge group among the plurality of battery packs.

2. The battery control apparatus according to claim 1, wherein the control circuit is further configured to:

if there is a battery pack among the plurality of battery packs having the SOH differing from the maximum SOH by more than the reference SOH, set each of the plurality of battery packs except the battery pack having the SOH differing from the maximum SOH by more than the reference SOH as a discharge candidate.

3. The battery control apparatus according to claim 1, wherein the grouping rule defines the first pack group to include a maximum number of battery packs from the plurality of battery packs in which a voltage difference between a maximum voltage and a minimum voltage is equal to or less than a reference voltage.

4. The battery control apparatus according to claim 1, wherein the control circuit is further configured to:

if a plurality of first pack groups is set, determine a sum of SOCs of each of the plurality of first pack groups, the sum of SOCs being a sum of SOCs of all battery packs included in each first pack group, and set each first pack group having a maximum sum of SOCs among the plurality of first pack groups as a second pack group, and if only a single second pack group is set, set the single second pack group as the discharge group.

5. The battery control apparatus according to claim 4, wherein the control circuit is further configured to:

if a plurality of second pack groups is set, set each second pack group having a maximum number of members among the plurality of second pack groups as a third pack group, and if only a single third pack group is set, set the single third pack group as the discharge group.

6. The battery control apparatus according to claim 5, wherein the control circuit is further configured to:

if a plurality of third pack groups is set, determine a discharge risk factor of each of the plurality of third pack groups, and set a third pack group having a lowest discharge risk factor among the plurality of third pack groups as the discharge group.

7. The battery control apparatus according to claim 5, wherein the control circuit is further configured to:

if a plurality of third pack groups is set, determine a discharge priority factor of each of the plurality of third pack groups, and set a third pack group having a highest discharge priority factor among the plurality of third pack groups as the discharge group.

8. A battery system comprising the battery control apparatus according to claim 1.

9. A power supply system comprising the battery system according to claim 8.

10. A battery discharge control method for use with a battery control apparatus comprising a plurality of switching circuits, each connected in series to a corresponding one of a plurality of battery packs in a one-to-one relationship, and a plurality of sensing circuits connected respectively to the plurality of battery packs in a one-to-one relationship, and configured to generate a sensing signal indicating a voltage and a current of each of the plurality of battery packs, the battery discharge control method comprising:

determining the voltage, a state of health (SOH), and a state of charge (SOC) of each of the plurality of battery packs based on the sensing signal from a corresponding one of the sensing circuits;

if there is no battery pack among the plurality of battery packs having the SOH differing from a maximum SOH of the plurality of battery packs by more than a reference SOH, setting each of the plurality of battery packs as a discharge candidate;

setting at least one first pack group, including at least one battery pack among the plurality of battery packs, by applying a grouping rule to the discharge candidates;

if a single first pack group is set in the setting of at least one first pack group, setting the single first pack group as a discharge group; and turning on each switching circuit among the switching circuits corresponding to at least one battery pack among the plurality of battery packs included in the discharge group, and turning off one or more other switching circuits among the switching circuits corresponding to any remaining battery pack not in the discharge group among the plurality of battery packs.

11. The battery discharge control method according to claim 10, further comprising:

if there is any battery pack having the SOH differing from the maximum SOH by more than the reference SOH, setting each of the plurality of battery packs except the battery pack having the SOH differing from the maximum SOH by more than the reference SOH among the plurality of battery packs as a discharge candidate.

12. The battery discharge control method according to claim 10, wherein the grouping rule defines the first pack group to include a maximum number of battery packs from the plurality of battery packs in which a voltage difference between a maximum voltage and a minimum voltage is equal to or less than a reference voltage.

13. The battery discharge control method according to claim 10, further comprising:

if a plurality of first pack groups is set in the setting of at least one first pack group, determining a sum of SOCs of each of the plurality of first pack groups, the sum of SOCs being a sum of SOCs of all battery packs included in each first pack group, and setting each first pack group having a maximum sum of SOCs among the plurality of first pack groups as a second pack group, and if only a single second pack group is set, setting the single second pack group as the discharge group.

14. The battery discharge control method according to claim 13, further comprising:

if a plurality of second pack groups is set, setting each second pack group having a maximum number of members among the plurality of second pack groups as a third pack group, and if only a single third pack group is set, setting the single third pack group as the discharge group.

15. The battery discharge control method according to claim 14, further comprising:
if a plurality of third pack groups is set, determining a discharge risk factor of each of the plurality of third pack groups, and setting a third pack group having a lowest discharge risk factor among the plurality of third pack groups as the discharge group.

16. The battery discharge control method according to claim 14, further comprising:
if a plurality of third pack groups is set, determining a discharge priority factor of each of the plurality of third pack groups, and setting a third pack group having a highest discharge priority factor among the plurality of third pack groups as the discharge group.

* * * * *